(12) United States Patent
Nakano

(10) Patent No.: US 9,090,421 B2
(45) Date of Patent: Jul. 28, 2015

(54) OPTICAL DISK RETRIEVAL DEVICE AND METHOD

(75) Inventor: Shoji Nakano, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 151 days.

(21) Appl. No.: 13/881,822

(22) PCT Filed: Jun. 22, 2011

(86) PCT No.: PCT/JP2011/003567
§ 371 (c)(1),
(2), (4) Date: Apr. 26, 2013

(87) PCT Pub. No.: WO2012/056613
PCT Pub. Date: May 3, 2012

(65) Prior Publication Data
US 2013/0223969 A1  Aug. 29, 2013

(30) Foreign Application Priority Data

Oct. 28, 2010 (JP) .................................. 2010-241633

(51) Int. Cl.
*B65H 3/54* (2006.01)
*B65G 47/91* (2006.01)
*G11B 17/08* (2006.01)

(52) U.S. Cl.
CPC .......... *B65H 3/54* (2013.01); *B65G 47/91* (2013.01); *B65H 2301/4234* (2013.01); *G11B 17/08* (2013.01)

(58) Field of Classification Search
USPC ......... 221/198, 232, 238, 258, 268, 270, 272, 221/273, 274, 275, 36; 271/104, 105, 121, 271/134, 135, 137, 139, 142, 18.3; 294/93, 294/98.1; 369/30.55; 414/796.1, 797, 414/797.5, 797.7, 798.2, 908, 910
See application file for complete search history.

(56) References Cited

U.S. PATENT DOCUMENTS 3,744,788 A * 7/1973 Parker et al. ...................... 271/1
4,079,512 A * 3/1978 Lakes ............................. 29/732

(Continued)

FOREIGN PATENT DOCUMENTS

| CN | 101281762 | 10/2008 |
|---|---|---|
| JP | 5-42245 | 6/1993 |

(Continued)

OTHER PUBLICATIONS

International Search Report issued Sep. 20, 2011 in International (PCT) Application No. PCT/JP2011/003567.

(Continued)

*Primary Examiner* — Gregory Adams
(74) *Attorney, Agent, or Firm* — Wenderoth, Lind & Ponack, L.L.P.

(57) ABSTRACT

An optical disk retrieval device separates and retrieves a plurality of loaded optical disks one by one in order from top. The device includes: a base that loads the plurality of optical disks; A pulling-up unit for pulling up the top optical disk of the plurality of loaded optical disks; a separation member that can cause a force to act on an inner wall of an inner hole of a plate-like member having the inner hole; and A separation member elevating unit for moving the separation member in a vertical direction. The pulling-up unit lifts the top optical disk upward, and the separation member elevating unit passes the separation member through an inner circumferential hole of the top optical disk lifted by the pulling-up unit from an upper side to a lower side. The separation member causes the force to act on the inner wall of the inner hole of the plate-like member adhering directly beneath the top optical disk to thereby separate the plate-like member.

6 Claims, 14 Drawing Sheets

(56) References Cited

U.S. PATENT DOCUMENTS

| | | | |
|---|---|---|---|
| 4,625,953 A * | 12/1986 | Hamatani | 271/1 |
| 5,048,811 A * | 9/1991 | Hochbein | 271/5 |
| 6,802,070 B2 * | 10/2004 | Britz et al. | 720/619 |
| 6,886,827 B2 * | 5/2005 | Dachtler | 271/106 |
| 7,789,442 B2 | 9/2010 | Arai | |
| 2007/0267881 A1 | 11/2007 | Arai | |
| 2007/0280057 A1 | 12/2007 | Ikeda | |
| 2008/0250437 A1 | 10/2008 | Honma | |

FOREIGN PATENT DOCUMENTS

| | | |
|---|---|---|
| JP | 6-82055 | 11/1994 |
| JP | 2001-126369 | 5/2001 |
| JP | 2005-44392 | 2/2005 |
| JP | 2007-310920 | 11/2007 |

OTHER PUBLICATIONS

International Preliminary Report on Patentability and Written Opinion issued May 23, 2013 in International (PCT) Application No. PCT/JP2011/003567.

Chinese Search Report (SR) issued Dec. 17, 2014 in corresponding Chinese Patent Application No. 201180051585.4, together with English translation thereof.

* cited by examiner

OPTICAL DISK RETRIEVAL DEVICE AND METHOD

TECHNICAL FIELD

The present invention relates to a device and a method for retrieving loaded optical disks one by one in production of optical disks.

BACKGROUND ART

When optical disks are loaded, mutual firm attachment puts a space between both surfaces into a zero atmosphere state, so that the optical disks easily adhere to one another. In order to prevent the above-described adhesion, in an inner circumferential portion of the optical disk, a projected portion is provided. However, in a plurality of loaded optical disks, slight warpage of the optical disk causes mutual firm attachment and adhesion in an intermediate circumferential portion and an outer circumferential portion.

In the production of the optical disks, a process for retrieving the loaded optical disks one by one is indispensable. Consequently, there has been developed a device to surely and efficiently retrieve one by one from the plurality of loaded optical disks, between which the mutual firm attachment easily occurs.

In Patent Document 1, there has been disclosed a device to retrieve the loaded optical disks one by one as described above. In the same device, works (disks) loaded on a work loading table at a fixed height are sequentially retrieved one by one. Particularly, in the same device, air from an air blow nozzle is constantly blown between the top work and the next work to thereby separate the top work from the next work.

Moreover, a device disclosed in Patent Document 2 is configured so that a top one of the loaded compact disks is sucked by a disk suction unit having three suction pads. At this time, among the three suction pads, an arm portion of each of the two suction pads is longer than an arm portion of the other suction pad, by which in the same device, only the top disk is retrieved in distinction from the other disks. Moreover, in Patent Document 2, there are disclosed a device in which a nozzle for antistatic neutralization air removes static electricity charged in a disk to thereby retrieve only a top disk, and a device in which a belt is brought into contact with an end surface of a compact disk to retrieve only a top disk.

PRIOR ART DOCUMENT

Patent Document

Patent Document 1: JP 5-042245 U
Patent Document 2: JP 6-082055 U

A surface of the optical disk is very smooth mirror plane. Consequently, when the plurality of optical disks are loaded, a space between the optical disk surfaces, which are the mirror planes, particularly in intermediate circumferential portions and outer circumferential portions of the optical disks, is easily put into a vacuum state. In addition, static electricity may be slightly generated between the optical disk surfaces. When the vacuum state occurs, or when the static electricity is generated as described above, adhesion force between the plurality of optical disks may become larger in accordance with the vacuum state and the electrostatic state. Consequently, in the device to retrieve the loaded optical disks one by one in the conventional production of the optical disks, depending on the state of the adhesion of the plurality of optical disks, the function of surely retrieving one by one from the plurality of loaded optical disks may not be realized.

The present invention solves the above-described problem, and one non-limiting and exemplary embodiment provides an optical disk retrieval device and an optical disk retrieval method that enable a plurality of loaded optical disks to be surely retrieved one by one.

SUMMARY OF THE INVENTION

In order to solve the above-described problem, an optical disk retrieval device according to the present invention is an optical disk retrieval device that separates and retrieves a plurality of loaded optical disks one by one in order from top, the device including:

a base that loads the plurality of optical disks;

pulling-up unit for pulling up the top optical disk of the plurality of loaded optical disks;

a separation member that can cause a force to act on an inner wall of an inner hole of a plate-like member having the inner hole; and separation member elevating unit for moving the separation member in a vertical direction, wherein the pulling-up unit lifts the top optical disk upward, and the separation member elevating unit passes the separation member through an inner circumferential hole of the top optical disk lifted by the pulling-up unit from an upper side to a lower side, and the separation member causes the force to act on the inner wall of the inner hole of the plate-like member adhering directly beneath the top optical disk to thereby separate the plate-like member.

Moreover, a method according to the present invention is a method for separating and retrieving a plurality of loaded optical disks one by one in order from top, the method including:

lifting a top optical disk of the plurality of loaded optical disks upward;

detecting whether or not a plate-like member adheres directly beneath the top optical disk lifted upward; and passing a separation member through an inner circumferential hole of the top optical disk from an upper side to a lower side when it is detected that the plate-like member adheres directly beneath the top optical disk lifted upward, by which the separation member causes a force to act on an inner wall of an inner hole of the plate-like member adhering directly beneath the top optical disk to thereby separate the plate-like member from the top optical disk.

Effect of the Invention

According to the present invention, since the separation member causes the force to act on the inner wall of the inner circumferential hole of the optical disk adhering directly beneath the lifted top optical disk to thereby separate these optical disks, the device and the method for surely retrieving the loaded optical disks one by one in the production of the optical disks can be realized.

DETAILED DESCRIPTION OF THE INVENTION

Figure 1:
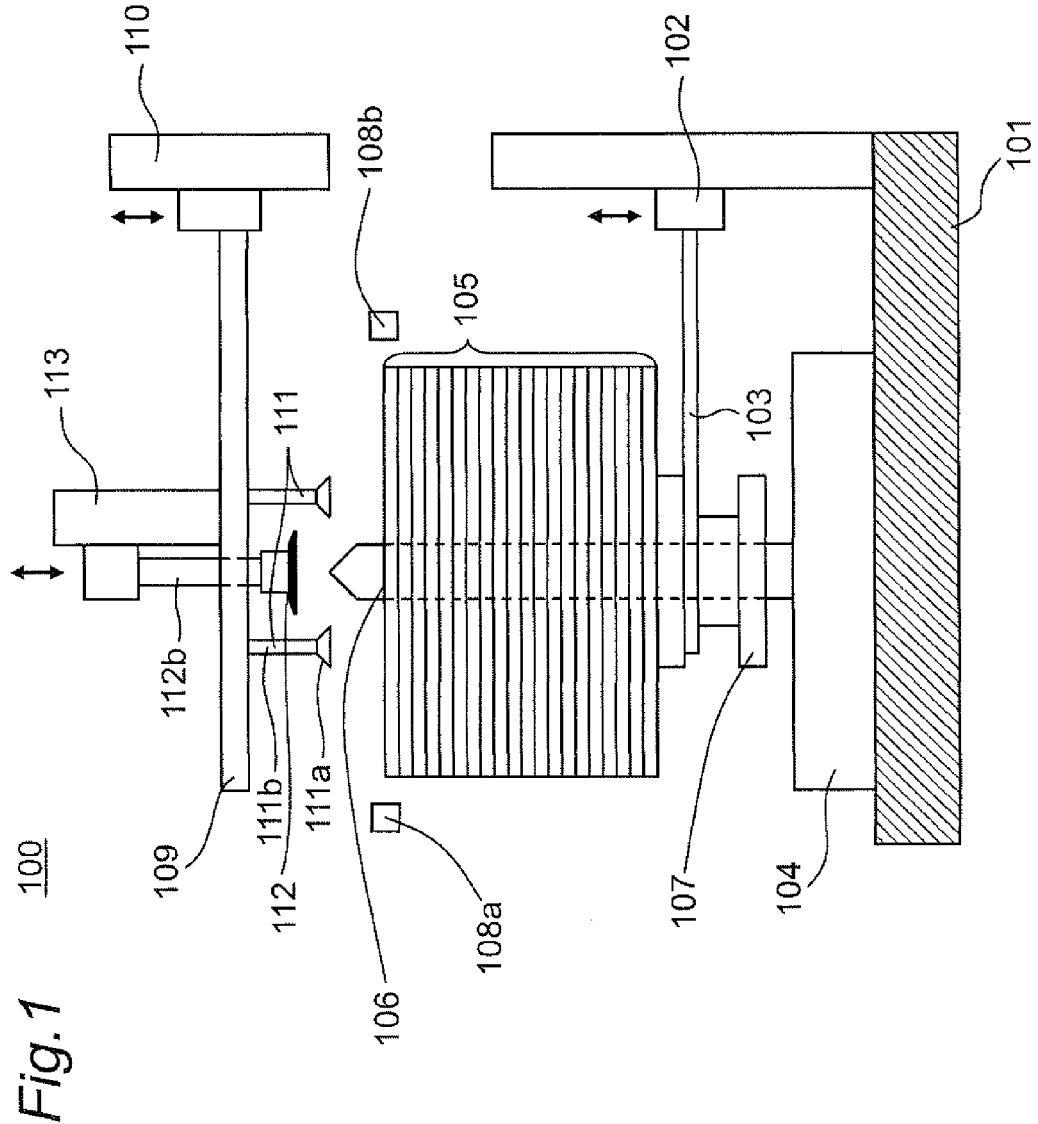
FIG. 1 is a schematic configuration view of an optical disk retrieval device according to a first embodiment of the present invention.

Hereinafter, referring to the drawings, embodiments of the present invention will be described.

1. First Embodiment

FIG. 1 is a schematic configuration view of an optical disk retrieval device 100 according to a first embodiment of the present invention. In the optical disk retrieval device 100 according to the present embodiment, a separation member vertically moving in inner circumferential holes of optical disks causes a force to act on an inner wall of the inner circumferential hole of the optical disk adhering directly beneath the top optical disk of the two (or more) optical disks lifted by suction pads, by which the optical disk adhering directly beneath the top optical disk is dropped. This realizes sure retrieval of only the top one of the loaded optical disks.

1.1. Configuration of Optical Disk Retrieval Device

The optical disk retrieval device 100 according to the present embodiment shown in FIG. 1 schematically includes a base portion 101, a first lifting mechanism 102, a lifting arm 103, a stack pole base 104, a stack pole shaft 106, a lifting ring 107, a level detecting sensor projection portion and a light-receiving portion 108a, 108b, a suction frame 109, a second lifting mechanism 110, suction pads 111, a rubber-like elastic body 112, and a third lifting mechanism 113.

To the base portion 101 of the optical disk retrieval device 100 is attached the first lifting mechanism 102 that vertically moves the lifting arm 103 by a motor or the like. Furthermore, to the stack pole base 104 fixed and set on the base portion 101 is attached the stack pole shaft 106 to integrate both.

A hole is opened at a center of the lifting ring 107, and the stack pole shaft 106 is passed through this hole. Above the lifting ring 107, a plurality of optical disks 105 with the stack pole shaft 106 passed through inner circumferential holes thereof are loaded. Accordingly, the first lifting mechanism 102 vertically moves, so that the lifting arm 103 and the lifting ring 107 vertically move, thereby resulting in vertically moving the loaded optical disks 105.

The loaded optical disks, through which the stack pole shaft 106 is passed, are not limited to the optical disks as finished products. For example, the optical disk retrieval device 100 according to the present invention can be used for the unfinished optical disks before a label printing process, before a back-surface sputtering process, or the like.

The level detecting sensor projection portion 108a and the level detecting sensor light-receiving portion 108b detect that the top one of the loaded optical disks 105 reaches a height of the optical disk retrieval by the operation of the first lifting mechanism 102, the lifting arm 103 and the lifting ring 107. Here, for the level detecting sensor projection portion 108a and the level detecting sensor light-receiving portion 108b, a transmission type beam sensor is used. When the top one of the optical disks 105 does not reach the height of the retrieval, an optical beam emitted from the level detecting sensor projection portion 108a reaches the level detecting sensor light-receiving portion 108b, so that the level detecting sensor light-receiving portion 108b receives the optical beam. Since when the top one of the optical disks 105 reaches the height of the retrieval, the top optical disk 105 shields the optical beam, the level detecting sensor light-receiving portion 108b does not receive the optical beam. In this manner, the presence or absence of reception of the optical beam by the level detecting sensor light-receiving portion 108b allows the height of the top one of the loaded optical disks 105 to be detected.

Thus, the first lifting mechanism 102, the lifting arm 103 and the lifting ring 107 lift the loaded optical disks 105 above the lifting ring 107 until the top one reaches the position of the detection by the level detecting sensor projection portion 108a and the level detecting sensor light-receiving portion 108b.

The suction frame 109 is attached to the second lifting mechanism 110 that can be vertically operated by a motor, an air cylinder or the like. To a lower portion of this suction frame 109 are plurally attached the suction pads 111 each made up of a shaft portion 111b and a pad portion 111a. To an upper portion of the suction frame 109 is attached the third lifting mechanism 113 that vertically moves a separation member (i.e., the rubber-like elastic body 112) through a movable shaft 112b.

In order to retrieve the top one of the loaded optical disks 105, the pad portions 111a of the suction pads 111 vacuum-suck an upper surface of the relevant optical disk, and are made of silicon rubber or the like. Normally, three or four suction pads 111 are provided on a predetermined circumference so as to equally divide the circumference. Furthermore, these suction pads 111 are provided so that the pad portions 111a suck the upper surface of the optical disk 105 near the inner circumferential hole inside a signal surface of the optical disk. In the present embodiment, the suction pads 111 are provided at three positions, and as the pad portions 111a, disk-shaped pad portions each having a diameter of 6 mm are used.

The suction pads 111 are temporarily fixed firmly to the upper surface of the optical disk by the vacuum suction to pull up the optical disk. Any pulling-up unit that can be temporarily fixed firmly to the upper surface of the optical disk by another action (e.g., static electricity or the like) may be used in place of the suction pads ill.

Each of the suction pads 111 (the pad portions 111a) of the optical disk retrieval device 100 according to the present embodiment generates a suction force of 2.645 N (0.269 kgf) when a vacuum suction level is −93.3 kPa (−700 mmHg), and the three suction pads ill generate a suction force of 7.935 N (0.807 kgf).

The suction pads 111 need not be plurally provided, but only one ring pad may be provided as the suction pad.

The rubber-like elastic body 112 as the separation member has a disk shape, and has a diameter larger than a diameter of the inner circumferential hole of each of the optical disks 105 by about 0.1 mm to 0.5 mm. In the present embodiment, as the rubber-like elastic body 112, a suction pad formed of silicon rubber is used, the diameter thereof is larger than the diameter of the inner circumferential hole of the optical disk by 0.2 mm, and a hardness thereof is A60. The rubber-like elastic body 112 is integrated with the movable shaft 112b, and the rubber-like elastic body 112 and the movable shaft 112b are vertically moved by the third lifting mechanism 113 attached to the upper portion of the suction frame 109.

1.2. Overall Operation of Optical Disk Retrieval Device

Figure 2:
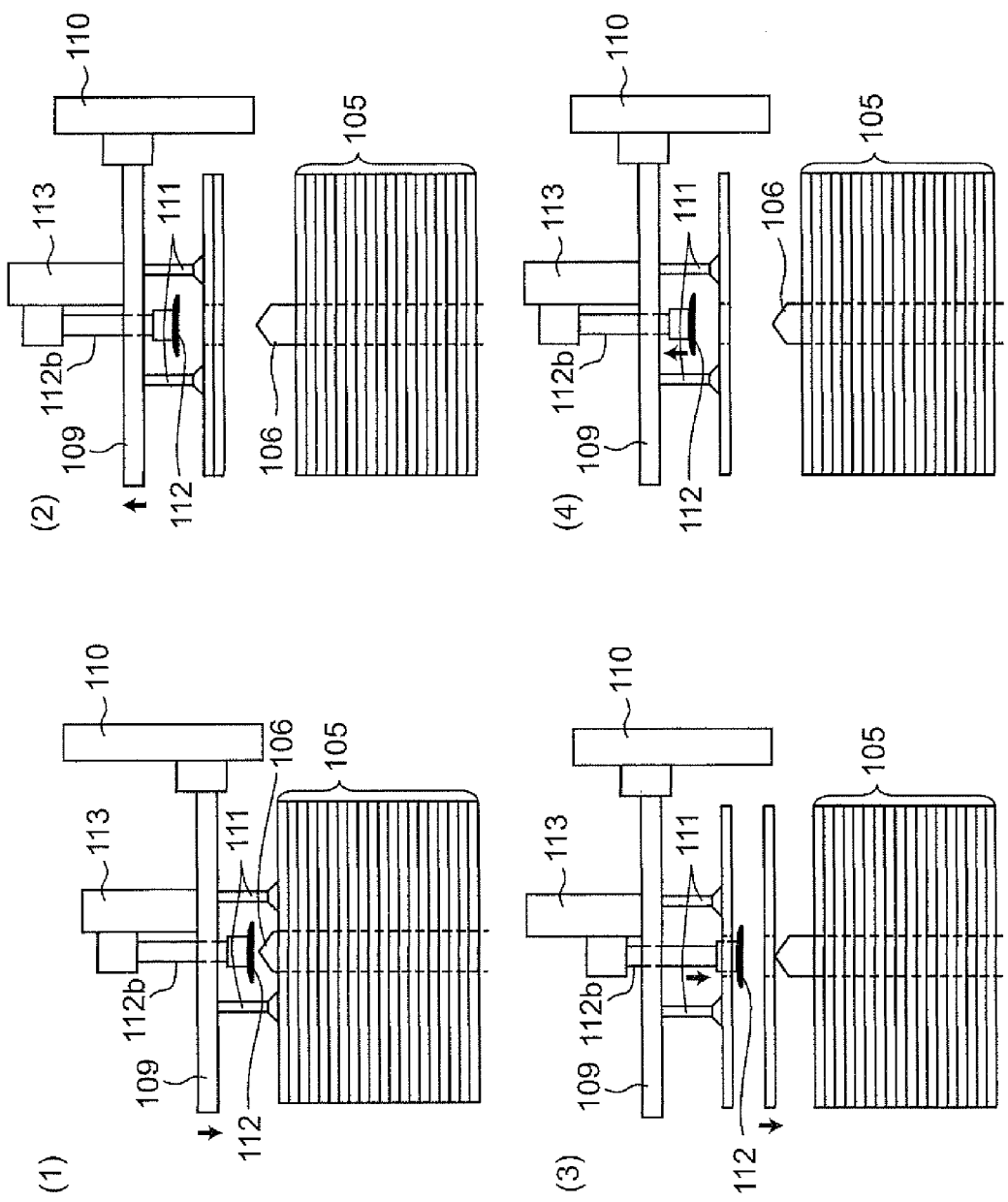
FIGS. 2(1) to 2(4) are views for describing overall operation of the optical disk retrieval device according to the first embodiment of the present invention.

FIGS. 2(1) to 2(4) are views for describing overall operation of the optical disk retrieval device 100 according to the present embodiment. In the optical disk retrieval device 100 according to the present embodiment, the second lifting mechanism 110 first lowers the suction frame 109 and the suction pads 111 to cause the pad portions 111a of the suction pads 111 to suck the surface of the top one of the loaded optical disks 105 (FIG. 2(1)).

Next, the second lifting mechanism 110 lifts the suction frame 109. Here, since the pad portions 111a of the suction pads 111 suck the top optical disk, the second lifting mechanism 110 lifts the top optical disk together with the suction frame 109 and the suction pads 111. At this time, in the situation where the space between the top optical disk surface and the second optical disk surface is substantially in the vacuum state, or in the situation where static electricity is generated between the top optical disk surface and the second optical disk surface, the second optical disk may be firmly attached, thereby coming together directly beneath the top optical disk. FIG. 2(2) shows the above-described occasion. The plurality of optical disks may be firmly attached and come together directly beneath the top optical disk, depending on the vacuum state and the static electricity generated state in the surfaces of the second, third and subsequent optical disks.

Next, in the situation where the second lifting mechanism 110 lifts the plurality of optical disks as shown in FIG. 2 (2), the third lifting mechanism 113 lowers the movable shaft 112b and the rubber-like elastic body 112 into the inner circumferential holes of the lifted optical disks. During this lowering, the third lifting mechanism 113, the movable shaft 112b and the rubber-like elastic body 112 are arranged so that a center of the disk shape of the rubber-like elastic body 112 traces a center of the inner circumferential holes of the lifted optical disks.

At this time, since the top optical disk is sucked and fixed by the pad portions 111a of the suction pads 111, the rubber-like elastic body 112 does not drop the top optical disk with a frictional force acting on an inner wall of the inner circumferential hole, even if the rubber-like elastic body 112 having the diameter a little larger than that of the inner circumferential hole of the optical disk is lowered through the inner circumferential hole. However, the second optical disk is fixed to the top optical disk only by a vacuum suction force and an electrostatic force working between the top optical disk and itself. Accordingly, when an outer edge portion of the rubber-like elastic body 112, which has passed through the inner circumferential hole of the top optical disk, reaches an upper portion of the inner wall of the inner circumferential hole of the second optical disk, the outer edge portion of the rubber-like elastic body 112 surely drops the second optical disk by the frictional force acting on the upper portion of the inner wall of the inner circumferential hole of the second optical disk. FIG. 2(3) is a view showing how the rubber-like elastic body 112 as the separation member, which has passed through the inner circumferential hole of the top optical disk, drops the second optical disk.

Next, the third lifting mechanism 113 passes the rubber-like elastic body 112 and the movable shaft 112b, which have dropped the second optical disk, through the inner circumferential hole of the top optical disk sucked and fixed by the pad portions 111a of the suction pads 111 to raise the same to an original position. FIG. 2(4) is a view showing how the rubber-like elastic body 112 passes through the inner circumferential hole of the top optical disk from bottom up to be returned to the original position. At this time point, the operation in which the optical disk retrieval device 110 retrieves only one from the loaded optical disks is completed.

1.3. Details of Retrieval Operation of the Optical Disk Retrieval Device

Using FIGS. 3 to 7, detailed description at the time of optical disk retrieval by the optical disk retrieval device 100 according to the present embodiment will be described.

Figure 3:
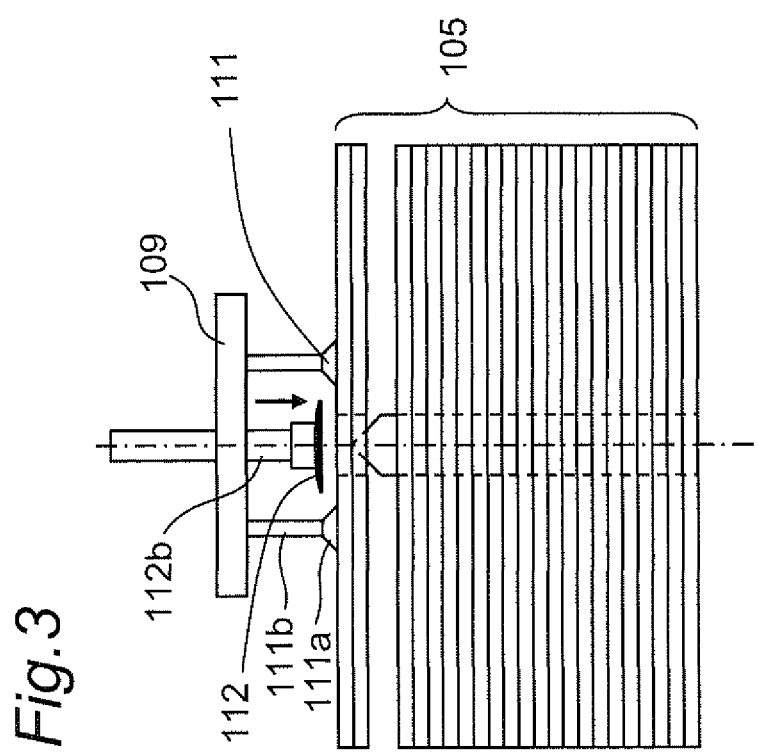
FIG. 3 is a view showing operation in which the optical disk retrieval device according to the first embodiment of the present invention lifts two optical disks.

FIG. 3 is a view showing the operation in which the optical disk retrieval device 100 according to the present embodiment lifts two optical disks 105. How the suction frame 109 and the suction pads 111 vacuum-suck the top one of the loaded optical disks 105 to lift the same is shown. At this time, the second optical disk is firmly attached and comes together directly beneath the top optical disk 105.

Figure 4:
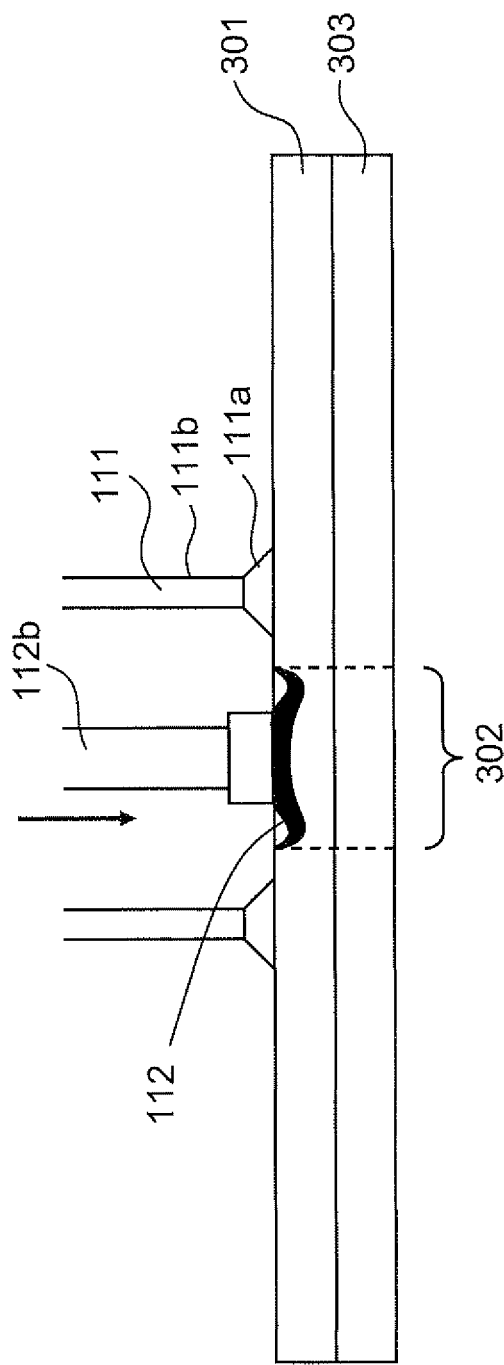
FIG. 4 is a view showing how a rubber-like elastic body passes through an inner circumferential hole of the first optical disk in the situation where the optical disks are lifted and fixed.
Figure 5:
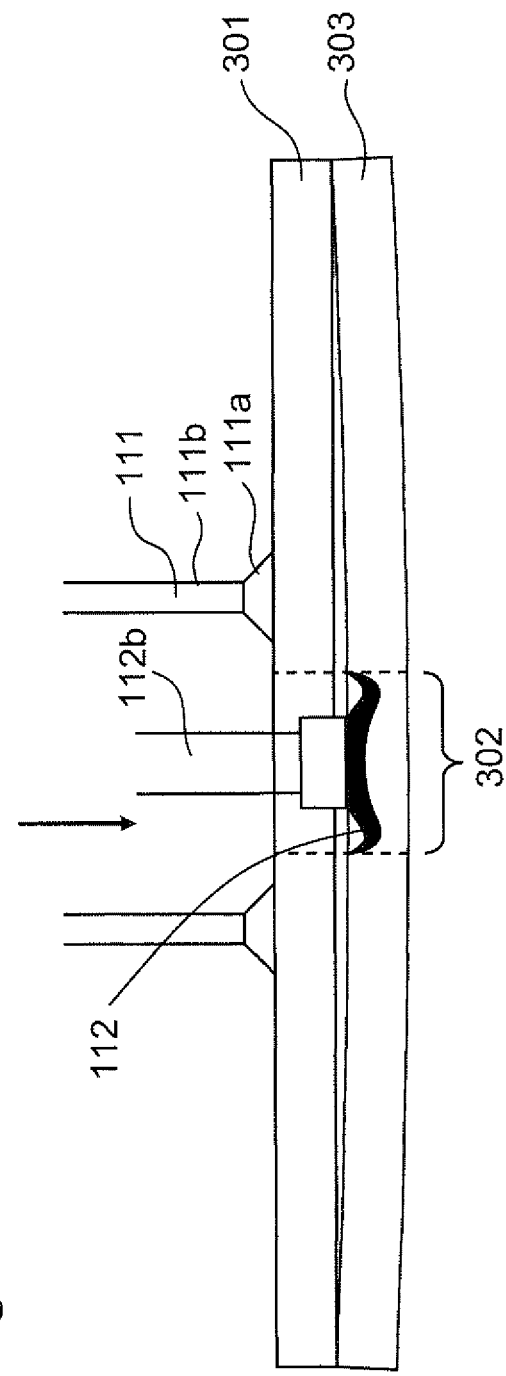
FIG. 5 is a view showing the rubber-like elastic body, the first optical disk, and the second optical disk when an outer edge portion of the rubber-like elastic body, which has passed through the inner circumferential hole of the first optical disk, reaches an upper portion of an inner wall of an inner circumferential hole of the second optical disk.

FIGS. 4 and 5 are views showing the operation when the rubber-like elastic body 112 passes downward through inner circumferential holes 302 of optical disks 301, 303. FIG. 4 shows how the rubber-like elastic body 112 passes through the inner circumferential hole 302 of the first optical disk 301 in the situation where the optical disks 301, 303 are lifted and fixed. Since the rubber-like elastic body 112 has the diameter a little larger than a diameter of the inner circumferential holes 302 of the optical disks 301, 303, as shown in FIG. 4, the rubber-like elastic body 112 passes through the inner circumferential hole 302 of the first optical disk 301 while the outer edge portion thereof deforms so as to curve upward.

Setting the diameter and the hardness of the rubber-like elastic body 112 to appropriate values prevents the frictional force when the rubber-like elastic body 112 passes through the inner circumferential hole 302 of the first optical disk 301 from tearing the first optical disk 301 from the suction pads 111 and dropping the same. As described before, in the rubber-like elastic body 112 of the optical disk retrieval device 100 according to the present embodiment, the diameter thereof is larger than the diameter of the inner circumferential hole of the optical disk by 0.2 mm, and the hardness is A60, and at this time, the frictional force is about 1 to 2 N. Varying the diameter and the hardness of the rubber-like elastic body 112 enables the frictional force to be changed.

FIG. 5 shows the rubber-like elastic body 112, the first optical disk 301 and the second optical disk 303 when the outer edge portion of the rubber-like elastic body 112, which has passed through the inner circumferential hole 302 of the first optical disk 301, reaches the upper portion of the inner wall of the inner circumferential hole of the second optical disk 303. At this time, a portion of the second optical disk 303 in the vicinity of an inner circumference is slightly deformed downward by the frictional force that the outer edge portion of the rubber-like elastic body 112 as the separation member causes to act on the upper portion of the inner wall of the inner circumferential hole of the second optical disk 303. This allows a slight gap to be formed between the first optical disk 301 and the second optical disk 303. The formation of this slight gap separates the second optical disk 303 from the first optical disk 301.

Figure 6:
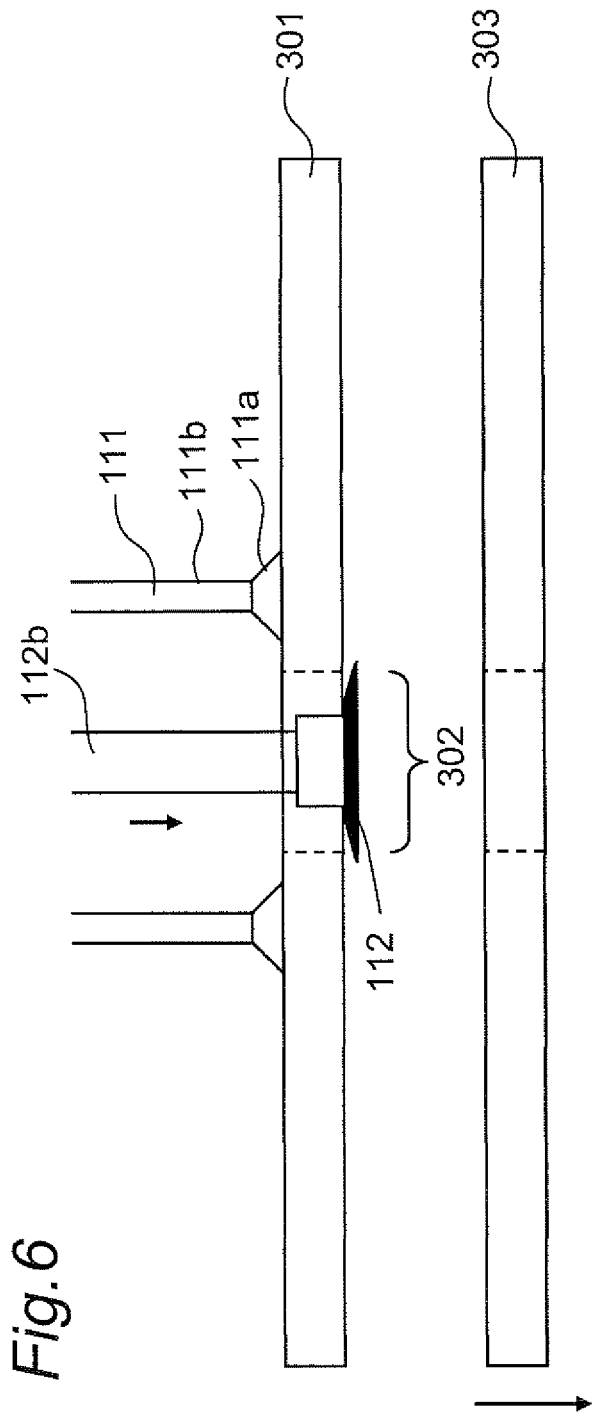
FIG. 6 is a view showing how the second optical disk completely separates and drops from the first optical disk.

FIG. 6 shows how the second optical disk 303 completely separates and drops from the first optical disk 301.

Figure 7:
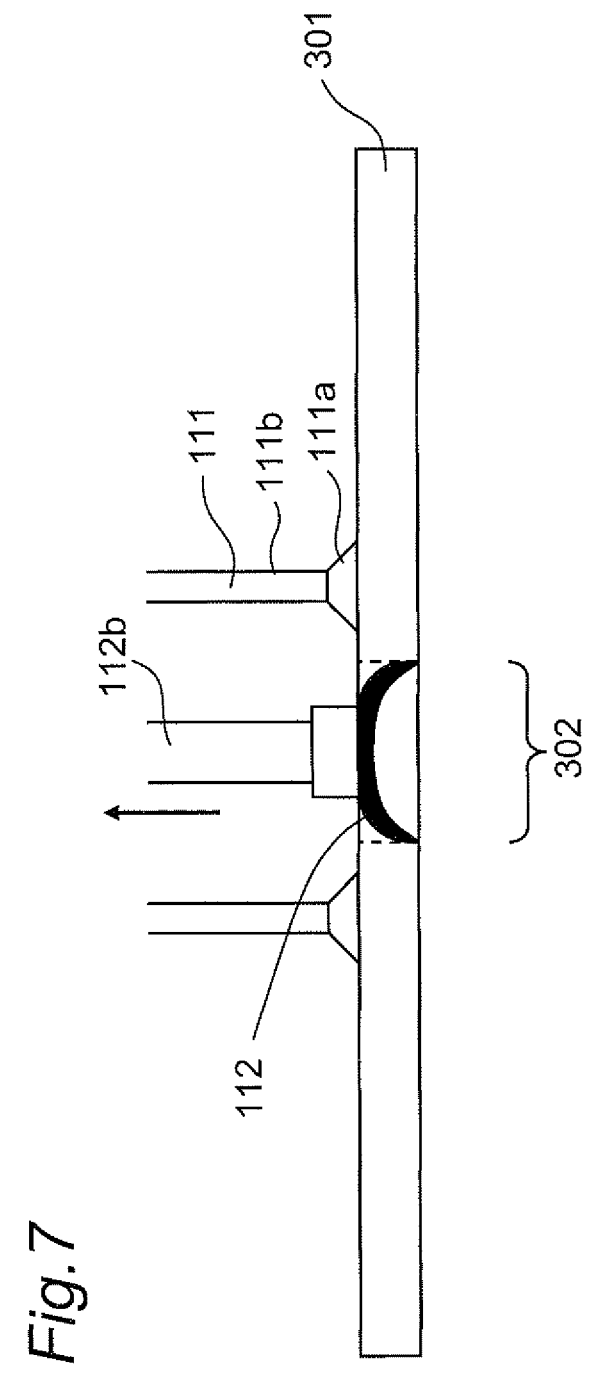
FIG. 7 is a view showing how the rubber-like elastic body passes upward through the inner circumferential hole of the first optical disk after the second optical disk drops.

FIG. 7 shows how the rubber-like elastic body 112 passes upward through the inner circumferential hole 302 of the first optical disk 301 after the second optical disk 303 has dropped. As shown in FIG. 7, the rubber-like elastic body 112 passes through the inner circumferential hole 302 of the first optical disk 301 while the outer edge portion of the rubber elastic body 112 deforms so as to curve downward. When the rubber-like elastic body 112 passes through the inner circumferential hole of the first optical disk 301 from bottom up to be returned to the original position, the operation in which the optical disk retrieval device 100 retrieves only one from the loaded optical disks is completed.

1.4. Other Elastic Bodies

In the optical disk retrieval device 100 according to the present embodiment, as the rubber-like elastic body (i.e., the separation member) for dropping the second and subsequent optical disks of the plurality of lifted optical disks, the disk-shaped suction pad formed of silicon rubber is used. The shape of the rubber-like elastic body is not limited to the disk shape. For example, any shape, such as a regular polygon and a clover shape, which has an appropriate elasticity at the outer edge portion thereof and can apply an appropriate frictional force to the inner wall of the inner circumferential hole of the optical disk can be employed.

Figure 8:
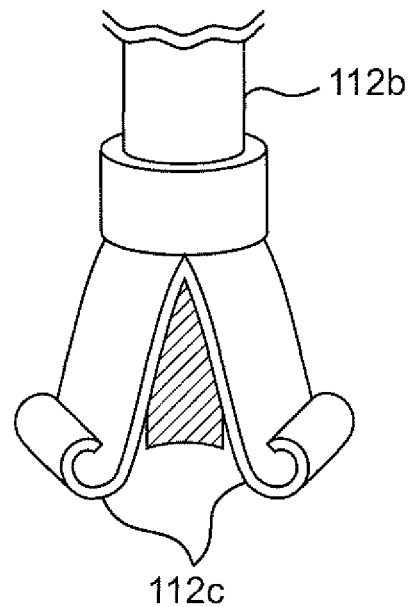
FIG. 8 is a view showing an elastic body formed of three plate springs using metal as a material.

Moreover, a material of the separation member is not limited to rubber, either. For example, as the elastic body to drop the second and subsequent optical disks, a metal spring member made of spring steel or the like, a plastic spring member made of polyacetal or the like can be used. FIG. 8 shows one example of the above-described elastic bodies, in which an elastic body 112c formed of three plate springs using metal or plastic as a material is shown. As shown in FIG. 8, forefront portions of the plate springs forming the elastic body 112c are curled, which enable the elastic body 112c to vertically move through the inner circumferential hole 302 of the top optical disk 301 sucked and fixed by the suction pads 111 while applying a frictional force to the inner wall of the circumferential hole. Moreover, outer circumferential portions of the plate springs forming the elastic body 112c enable the second optical disk 303 to be separated from the first optical disk 301 by the frictional force acting on the upper portion of the inner wall of the inner circumferential hole 302 of the second optical disk 303.

1.5. Another Loading Form of Optical Disks

In the above-described example shown in FIGS. 1 to 7, the plurality of optical disks 105 are loaded by passing the stack pole shaft 106 through the inner circumferential holes thereof. In the plurality of loaded optical disks in the optical disk retrieval device, spacers may be each sandwiched between the individual optical disks.

Figure 9:
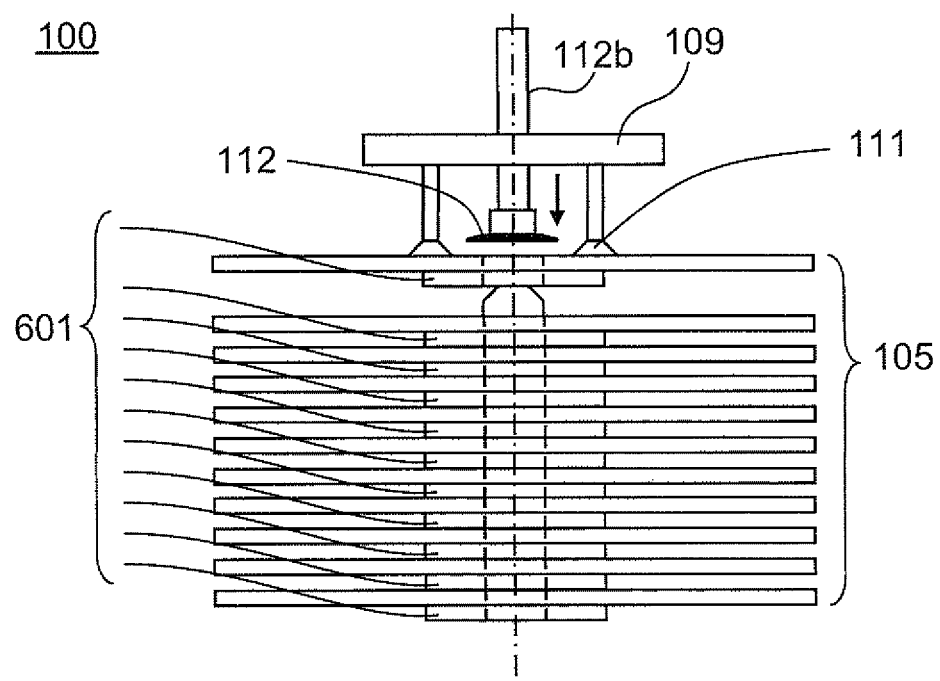
FIG. 9 is a view showing an example in which spacers are each sandwiched between the individual optical disks in the plurality of loaded optical disks in the optical disk retrieval device.

As shown in FIG. 9, a method has been widely used, in which in order to prevent damage occurrence by contact between the optical disks and firm attachment between the optical disks, spacers 601 are each inserted between the optical disks when the optical disks are loaded, so that the optical disks 105 and the spacers 601 are alternately loaded. The spacers 601 are each a circular plate that is smaller than each of the optical disks 105 but has an inner circumferential hole having substantially the same diameter as that of the optical disk 105, and are formed of plastic and are very lightweight.

However, since the spacers are very lightweight, a force generated by the firm attachment to the optical disk or by static electricity may allow the spacer directly beneath the top optical disk to adhere to a lower surface of the top optical disk and come together, when lifting the top optical disk from the loaded optical disks and the spacers. FIG. 9 shows how the spacer directly beneath the top optical disk adheres when the top optical disk is lifted.

In the optical disk retrieval device 100 according to the present embodiment, as shown in FIG. 9, even when the optical disks 105 and the spacers 601, which have the different outer diameters, are alternately loaded, the outer edge portion of the rubber-like elastic body 112 as the separation member can separate the spacer 601 from the optical disk by the frictional force acting on an upper portion of an inner wall of the inner circumferential hole of the spacer 601 adhering to the lower surface of the optical disk. Thereby, the optical disk retrieval device 100 according to the present embodiment can surely retrieve only the top optical disk.

Furthermore, in the optical disk retrieval device 100 according to the present embodiment, even when plate-like members each having an inner hole and the optical disks 105 are alternately loaded, the outer edge portion of the rubber-like elastic body 112 as the separation member can separate each of the plate-like members from each of the optical disks by the frictional force acting on an inner wall of the inner hole of the plate-like member adhering to the lower surface of the optical disk. Thus, in this case as well, the optical disk retrieval device 100 according to the present embodiment can surely retrieve only the top optical disk.

1.6. Conclusion

As described above, in the optical disk retrieval device 100 according to the present embodiment, by the circular elastic body (i.e., the separation member) vertically moving through the inner circumferential holes of the optical disks, the downward frictional force is applied to the inner wall of the inner circumferential hole of the optical disk adhering directly beneath the top optical disk of the two (or more) lifted by the suction pads. Thereby, the optical disk(s) below can be surely dropped, excluding the top optical disk sucked and fixed by the suction pads of the two (or more) optical disks lifted by the suction pads. After the optical disk below is dropped, the optical disk retrieval device 100 passes the elastic body through the inner circumferential hole of the top optical disk sucked and fixed by the suction pads to return the elastic body to the original position. Doing the foregoing enables the optical disk retrieval device 100 according to the present embodiment to surely retrieve only the top one of the loaded optical disks. When the optical disks and the spacers (or the plate-like members) are alternately loaded as well, only the top optical disk can be surely retrieved similarly.

2. Second Embodiment

An optical disk retrieval device according to a second embodiment of the present invention is characterized by a separation member that causes a force to act on second and subsequent optical disks when separating the second and subsequent optical disks from a top optical disk in a situation where a suction frame 109 and suction pads 111 lift the plurality of optical disks. That is, in the optical disk retrieval device according to the second embodiment of the present invention, as the separation member that causes the force to act on the second and subsequent optical disks, a clamp chuck is used. Using FIGS. 10 to 12, the optical disk retrieval device according to the second embodiment of the present invention will be described, focusing on a difference from the optical disk retrieval device according to the first embodiment.

2.1. Configuration of Clamp Chuck

Figure 10:
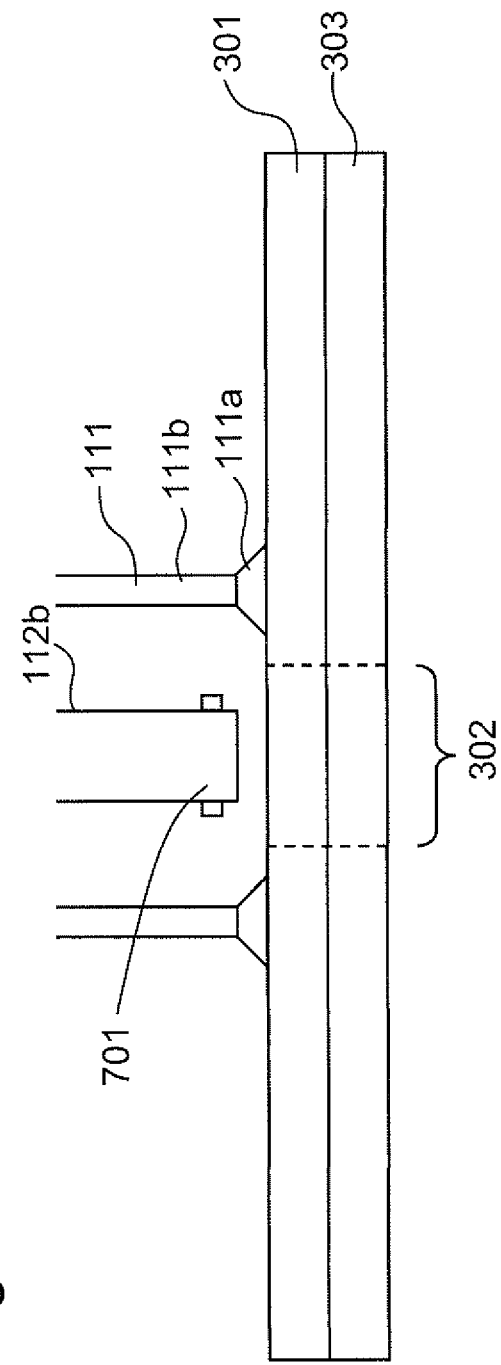
FIG. 10 is a view showing how a second lifting mechanism of an optical disk retrieval device according to a second embodiment of the present invention lifts two optical disks.

FIG. 10 is a view showing a movable shaft 112b and the suction pads 111 of the optical disk retrieval device 100 according to the second embodiment. In the optical disk retrieval device 100 according to the second embodiment, as the separation member in place of the rubber-like elastic body 112 used in the first embodiment, a clamp chuck 701 that is driven by a motor (not shown) or the like is used. The clamp chuck 701 is provided in a lower forefront portion of the movable shaft 112b vertically moving by a third lifting mechanism 113.

Figure 11:
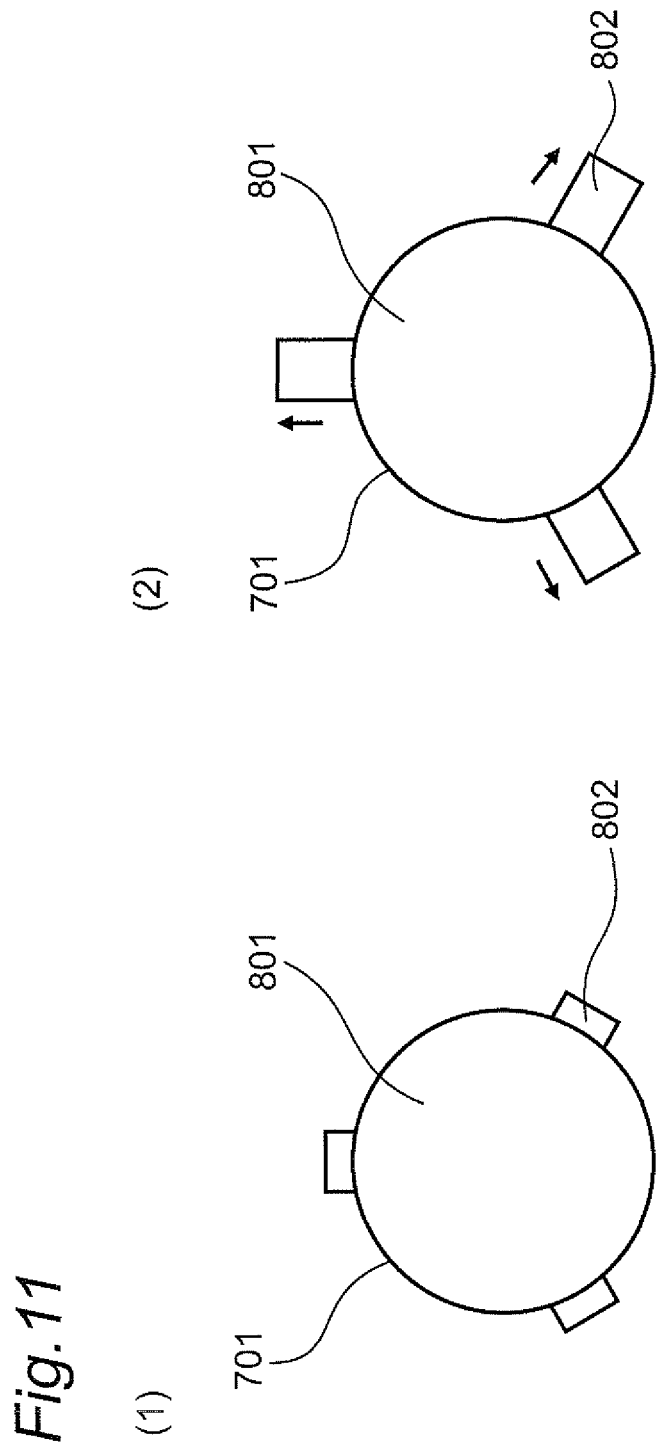
FIG. 11(1) is a bottom view of a clamp chuck in a state where chuck claws are closed, and FIG. 11(2) is a bottom view of the clamp chuck in a state where the chuck claws are opened.

FIG. 11 are bottom views of the clamp chuck 701. FIG. 11(1) shows a state where chuck claws 802 are closed (i.e., the individual chuck claws 802 are put into a clamp chuck body 801). FIG. 11(2) shows a state where the chuck claws 802 are opened (i.e., the individual chuck claws 802 protrude from the clamp chuck body 801). The chuck claws 802 are provided at three positions at an interval of a central angle of 120° in an outer circumference of the clamp chuck body 801. In the state where the chuck claws 802 are closed as shown in FIG. 11(1), an outer diameter of the clamp chuck 701 containing the three chuck claws 802 is smaller than a diameter of an optical disk inner circumferential hole. As shown in FIG. 11(2), the chuck claws 802 are opened in directions away from a center indicated by arrows. The chuck claws 802 are opened or closed by an action of a small compressor using compressed air, a motor or the like. In the state where the chuck claws 802 are opened as shown in FIG. 11(2), the outer diameter of the clamp chuck 701 containing the three chuck claws 802 is larger than the diameter of the optical disk inner circumferential hole.

2.2. Operation of Clamp Chuck and Optical Disk Retrieval Device

Figure 12:
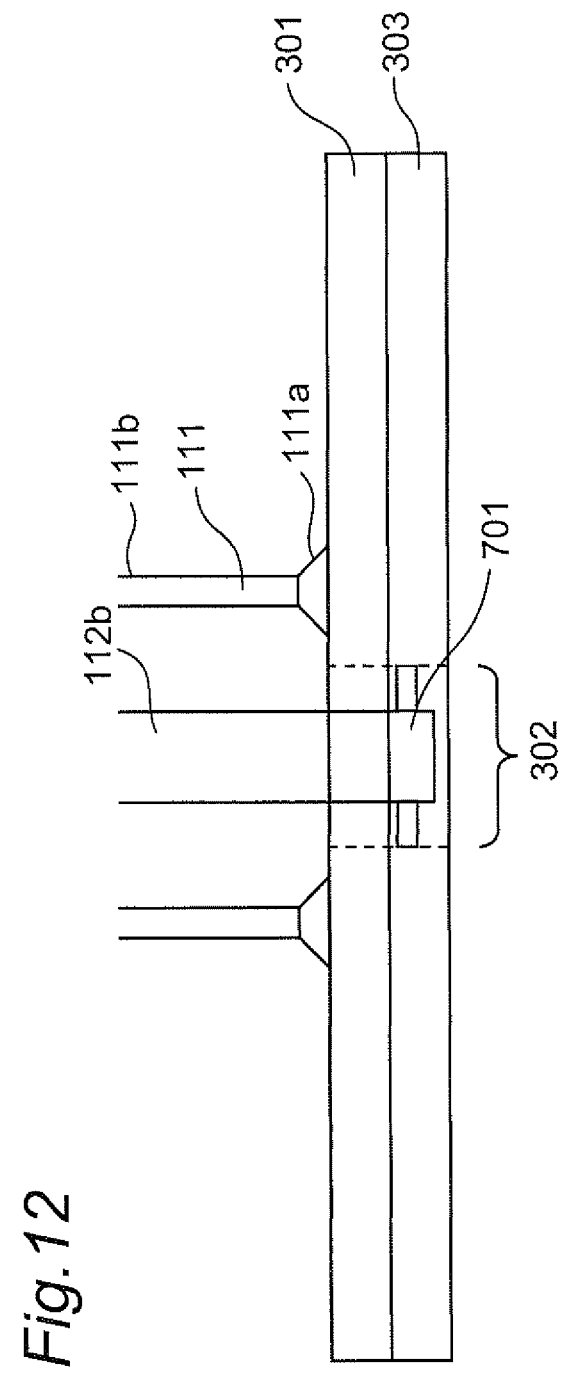
FIG. 12 is a view showing how the clamp chuck provided at a forefront of a movable shaft moves downward through inner circumferential holes of the two optical disks, and reaches the inner circumferential hole of the second optical disk, in the optical disk retrieval device according to the second embodiment.

FIG. 12 is a view showing how the clamp chuck 701 provided at the forefront of the movable shaft 112b moves downward through the inner circumferential holes of two optical disks 301, 303, and reaches an inner circumferential hole 302 of the second optical disk 303, in the optical disk retrieval device 100 according to the second embodiment. The clamp chuck 701 passes downward through the first (top) optical disk 301 in the state where the chuck claws 802 are closed. As shown in FIG. 12, the clamp chuck 701 stops lowering at the time point when it reaches the inner circumferential hole 302 of the second optical disk 303 to open the chuck claws 802.

As shown in FIG. 12, since in the state where the chuck claws 802 are opened, the chuck claws 802 push an inner wall of the inner circumferential hole 302 so as to push out the inner circumferential hole 302, a frictional force is generated between the chuck claws 802 and the inner wall of the inner circumferential hole of the second optical disk 303. The third lifting mechanism 113 further slightly lowers the movable shaft 112b and the clamp chuck 701 together with the second optical disk 303. This allows a slight gap to be formed between the first optical disk 301 and the second optical disk 303. The formation of this slight gap allows the second optical disk 303 to separate from the first optical disk 301.

After the separation of the second optical disk 303, the chuck claws 802 are closed. Consequently, the frictional force between the chuck claws 802 and the second optical disk 303 is eliminated, so that the second optical disk 303 drops. Thereafter, the third lifting mechanism 113 raises the movable shaft 112b and the clamp chuck 701 to return the same to an original position. At this time point, the operation in which the optical disk retrieval device 100 retrieves only one from the loaded optical disks is completed.

2.3. Conclusion

As described above, in the optical disk retrieval device 100 according to the second embodiment, by opening at appropriate timing the chuck claws 802 of the clamp chuck 701 vertically moving through the inner circumferential holes of the optical disks, the downward frictional force is applied to the inner wall of the inner circumferential hole 302 of the second optical disk 303 of the two (or more) optical disks lifted by the suction pads. This allows the second (and subsequent) optical disk(s) to be surely dropped. After the second (subsequent) optical disk(s) is (are) dropped, the optical disk retrieval device 100 according to the second embodiment closes the chuck claws 802 of the clamp chuck 701, and passes the clamp chuck 701 through the inner circumferential hole 302 of the top optical disk 301 sucked and fixed by the suction pads 111 to return the same to the original position. Doing the foregoing enables the optical disk retrieval device 100 according to the present embodiment to surely retrieve only the top one of the loaded optical disks.

When the optical disks and the spacers are alternately loaded, as shown in FIG. 9 as well, the optical disk retrieval device 100 according to the second embodiment can surely retrieve only the top optical disk 301. Moreover, when the plate-like members having the inner holes and the optical disks are alternately loaded as well, only the top optical disk 301 can be surely retrieved similarly.

3. Third Embodiment

An optical disk retrieval device according to a third embodiment of the present invention includes a sensor that detects whether or not a second optical disk 303 adheres to a top optical disk 301 and is lifted, when a suction frame 109 and a suction pads 111 lift the top optical disk 301. The other configurations are the same as those of the optical disk retrieval devices according to the foregoing first embodiment or second embodiment.

3.1. Configuration Involving Reflection Type Beam Sensor

Figure 13:
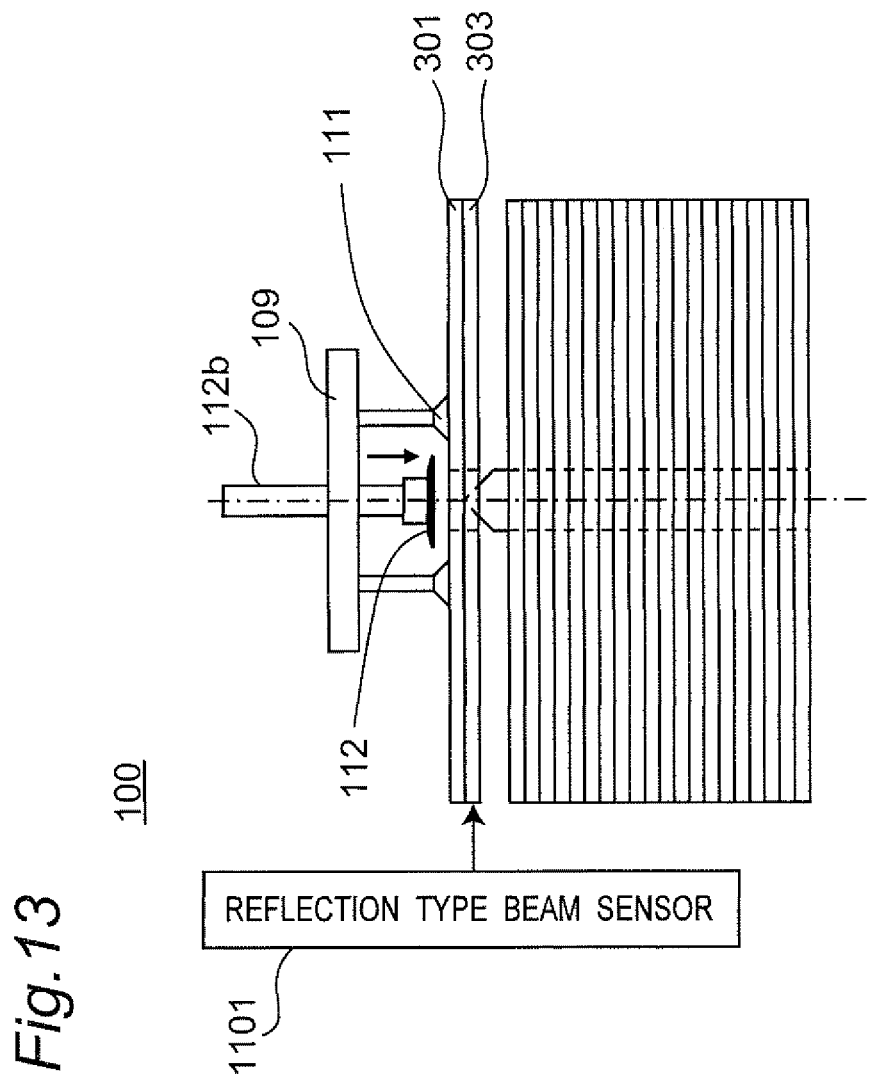
FIG. 13 is a view showing one configuration of an optical disk retrieval device according to a third embodiment of the present invention.

FIG. 13 is a view showing one configuration of an optical disk retrieval device 100 according to the third embodiment of the present invention. In the configuration shown in FIG. 13, a reflection type beam sensor 1101 is installed in the optical disk retrieval device according to the first embodiment. The reflection type beam sensor 1101 is a sensor that realizes the detection function by determining whether or not a projected optical beam will return as reflected light.

In the optical disk retrieval device 100 according to the third embodiment involving the reflection type beam sensor 1101, when the suction frame 109 and the suction pads 111 lift the top optical disk 301, the reflection type beam sensor 1101 projects the optical beam. If the second optical disk 303 adheres to the top optical disk 301, this optical beam is reflected at an outer circumferential end surface of the second optical disk 303, and the reflected light is received by the reflection type beam sensor 1101. If the second optical disk 303 does not adhere to the top optical disk 301, this optical beam is not reflected, and the reflection type beam sensor 1101 does not receive the optical beam. In this manner, the reflection type beam sensor 1101 realizes the detection function.

The reflection type beam sensor 1101 transmits a signal indicating the detection of presence or absence of the second optical disk to a control unit (not shown) of the optical disk retrieval device 100. If the signal from the reflection type beam sensor 1101 indicates the absence of the second optical disk, the control unit of the optical disk retrieval device 100 controls to complete the retrieval operation of the optical disk retrieval device 100 without moving a movable shaft 112b (and a rubber-like elastic body 112). If the signal from the reflection type beam sensor 1101 indicates the presence of the second optical disk, the control unit of the optical disk retrieval device 100 controls to move the movable shaft 112b (and the rubber-like elastic body 112) and separate the second (and subsequent) optical disk(s) 303, and then complete the retrieval operation.

Controlling in this manner reduces the vertical operation by a third lifting mechanism 113 in a number of times, and as a result, takt time of the whole device is shortened. Moreover, life duration of a drive unit of the third lifting mechanism 113 is made longer, and abrasion of the rubber-like elastic body 112 is reduced. Furthermore, an energy cost for moving the whole device is reduced. Obviously, even when the above-described reflection type beam sensor 1101 is installed in the optical disk retrieval device according to the second embodiment, as in the case where the reflection type beam sensor is installed in the optical disk retrieval device according to the first embodiment, the presence or absence of the adhesion of the second optical disk is detected, which brings about a similar effect.

3.2. Configuration Involving Transmission Type Beam Sensor

Figure 14:
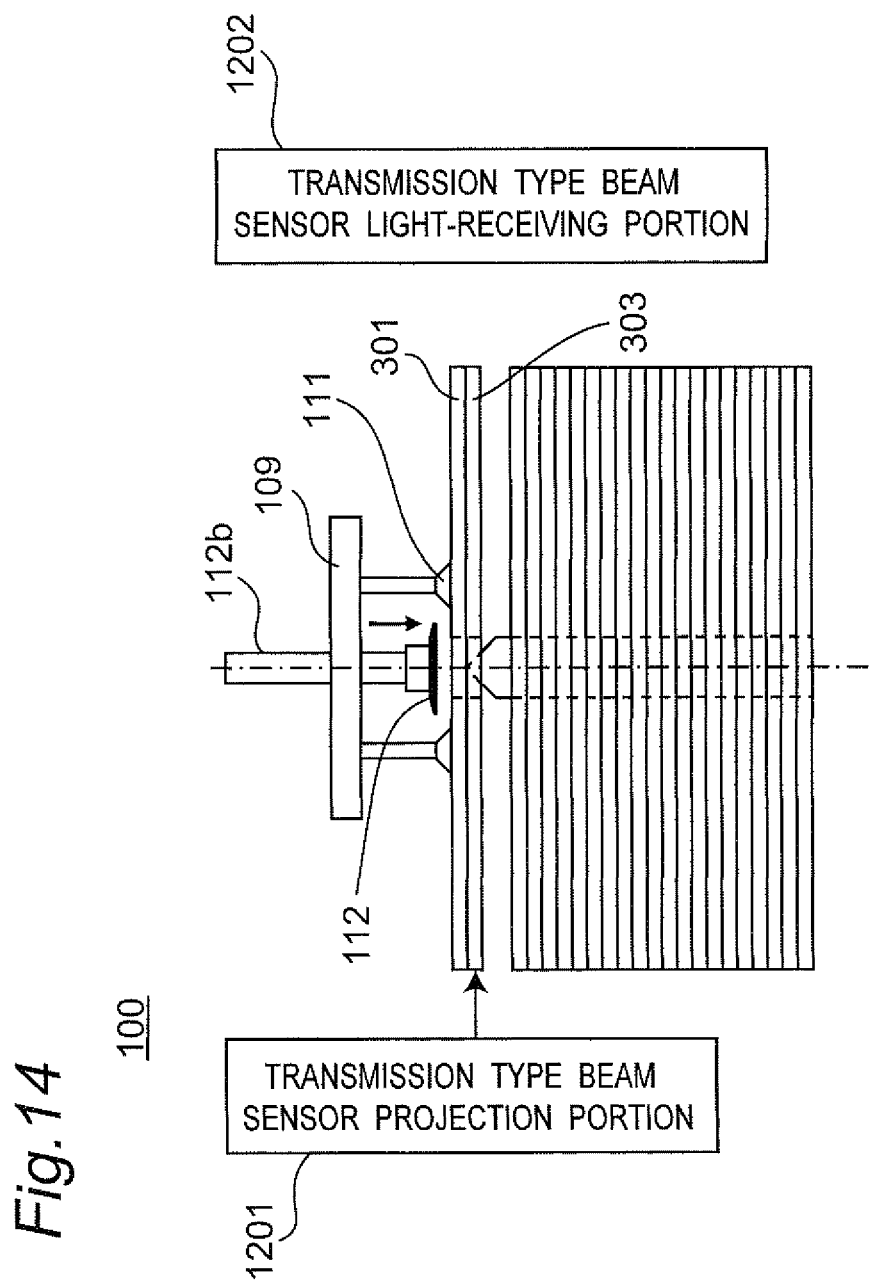
FIG. 14 is a view showing another configuration of the optical disk retrieval device according to the third embodiment of the present invention.

FIG. 14 is a view showing another configuration of the optical disk retrieval device 100 according to the third embodiment of the present invention. In the configuration shown in FIG. 14, in the optical disk retrieval device according to the first embodiment, a transmission type beam sensor, that is, a transmission type beam sensor projection portion 1201 and a transmission type beam sensor light-receiving portion 1202 are installed. The transmission type beam sensor projection portion 1201 and the transmission type beam sensor light-receiving portion 1202 make up a sensor that realizes a detection function by determining whether or not an optical beam projected by the transmission type beam sensor projection portion 1201 will be received by the transmission type beam sensor light-receiving portion 1202.

In the optical disk retrieval device 100 according to the third embodiment involving the transmission type beam sensor, when the suction frame 109 and the suction pads 111 lift the top optical disk 310, the transmission type beam sensor projection portion 1201 projects the optical beam. If the second optical disk 303 adheres to the top optical disk 301, this optical beam is shielded by the second optical disk 303, and thus, is not received by the transmission type beam sensor light-receiving portion 1202. If the second optical disk 303 does not adhere to the top optical disk 301, this optical beam is received by the transmission type beam sensor light-receiving portion 1202. In this manner, the transmission type beam sensor projection portion 1201 and the transmission type beam sensor light-receiving portion 1202 realizes the detection function.

The transmission type beam sensor light-receiving portion 1202 transmits a signal indicating the detection of presence or absence of the second optical disk to the control unit (not shown) of the optical disk retrieval device 100. The subsequent control by the control unit of the optical disk retrieval device 100 is similar to that of the foregoing reflection type beam sensor 1101.

The configuration as shown in FIG. 14 in which the transmission type beam sensor projection portion 1201 and the transmission type beam sensor light-receiving portion 1202 are installed also exerts a similar effect to that of the configuration shown in FIG. 13 in which the reflection type beam sensor 1101 is installed. In addition, in the configuration shown in FIG. 14 in which the transmission type beam sensor projection portion 1201 and the transmission type beam sensor light-receiving portion 1202 are installed, the detection function can be surely realized, even if variation in a shape of an outer circumferential end surface and a surface state of the optical disk makes reflection-ratio of the outer circumferential end surface of the optical disk unstable.

Even when the above-described transmission type beam sensor projection portion 1201 and the transmission type beam sensor light-receiving portion 1202 are installed in the optical disk retrieval device according to the second embodiment, the presence or absence of the adhesion of the second optical disk is detected, which brings about a similar effect, as in the case where they are installed in the optical disk retrieval device according to the first embodiment.

3.3. Configuration Involving Transmission Type Area Sensor

Figure 15:
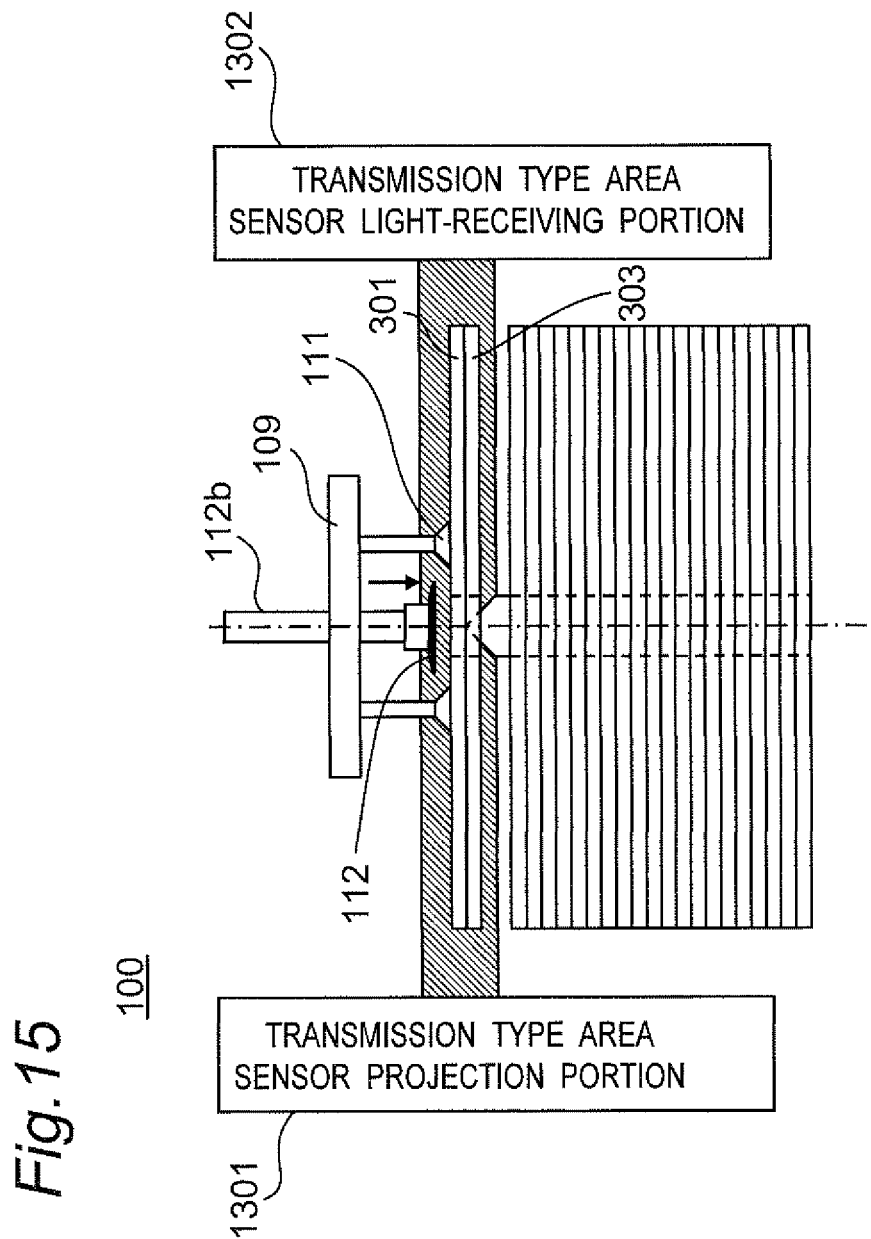
FIG. 15 is a view showing still another configuration of the optical disk retrieval device according to the third embodiment of the present invention.

FIG. 15 is a view showing still another configuration of the optical disk retrieval device 100 according to the third embodiment of the present invention. In the configuration shown in FIG. 15, a transmission type area sensor, that is, a transmission type area sensor projection portion 1301 and a transmission type area sensor light-receiving portion 1302 are installed in the optical disk retrieval device according to the first embodiment. The transmission type area sensor projection portion 1301 and the transmission type area sensor light-receiving portion 1302 make up a sensor in which the transmission type area sensor projection portion 1301 projects a wide beam, and the transmission type area sensor light-receiving portion 1302 measures an amount of reaching light of the wide beam. That is, in the transmission type area sensor projection portion 1301 and the transmission type area sensor projection portion 1302, the transmission type area sensor light-receiving portion 1302 can quantitatively measure an amount of shielded light with respect to the wide beam projected by the transmission type area sensor projection portion 1301.

In the optical disk retrieval device 100 according to the third embodiment involving the transmission type area sensor, when the suction frame 109 and the suction pads 111 lift the top optical disk 310, the transmission type area sensor projection portion 1301 projects the wide beam to an area with a width including a position where the lifted optical disk 301 exists. If the second optical disk 303 adheres to the top optical disk 301, a part of this wide beam is shielded by the top optical disk 301 and the second optical disk 303. If the second optical disk 303 does not adhere to the top optical disk 301, only the top optical disk 301 shields the wide beam. Thus, depending on whether or not the second optical disk 303 adheres to the top optical disk 301, the amount of reaching light to the transmission type area sensor light-receiving portion 1302 is increased or decreased. Thereby, the transmission type area sensor projection portion 1301 and the transmission type area sensor light-receiving portion 1302 perform the detection operation concerning the second optical disk.

The transmission type area sensor light-receiving portion 1302 transmits a signal indicating the detection of presence or absence of the second optical disk to the control unit (not shown) of the optical disk retrieval device 100. The subsequent control by the control unit of the optical disk retrieval device 100 is similar to that of the foregoing reflection type beam sensor 1101.

The configuration as shown in FIG. 15 in which the transmission type area sensor projection portion 1301 and the transmission type area sensor light-receiving portion 1302 are installed also exerts a similar effect to that of the configuration shown in FIG. 13 in which the reflection type beam sensor 1101 is installed. Also, this configuration exerts a similar effect to that of the configuration shown in FIG. 14 in which the transmission type beam sensor projection portion 1201 and the transmission type beam sensor light-receiving portion 1202 are installed. In further addition, in the configuration shown in FIG. 15 in which the transmission type area sensor projection portion 1301 and the transmission type area sensor light-receiving portion 1302 are installed, the detection function is realized stably even if a position in a height direction of the second optical disk 303 is unstable due to warpage of the optical disk.

Even when the above-described transmission type area sensor projection portion 1301 and the transmission type area sensor light-receiving portion 1302 are installed in the optical disk retrieval device according to the second embodiment, the presence or absence of the adhesion of the second optical disk is detected, which brings about a similar effect, as in the case where they are installed in the optical disk retrieval device according to the first embodiment.

4. Other Embodiments

The optical disk retrieval devices according to the first to third embodiments described above are each the device that surely retrieves only one disk, that is, the top optical disk when the plurality of optical disks are loaded, or when the optical disks and the spacers are alternately loaded. The invention according to the above-described first to third embodiments can also be applied to a device to retrieve loaded plate-like members each having an inner hole one by one.

INDUSTRIAL APPLICABILITY

The present invention is useful for a device to retrieve loaded optical disks one by one in production of optical disks.

EXPLANATION OF REFERENCES 101 base
102 first lifting mechanism
103 lifting arm
104 stack pole base
105 optical disk
106 stack pole shaft
107 lifting ring
108a level detecting sensor projection portion
108b level detecting sensor light-receiving portion
109 suction frame
110 second lifting mechanism
111 suction pad
112 rubber-like elastic body
113 third lifting mechanism
301 first optical disk
303 second optical disk
302 inner circumferential hole
601 spacer
701 clamp chuck
801 clamp chuck body
802 chuck claw
1101 reflection type beam sensor
1201 transmission type beam sensor projection portion
1202 transmission type beam sensor light-receiving portion
1301 transmission type area sensor projection portion
1302 transmission type area sensor light-receiving portion

The invention claimed is:

1. An optical disk retrieval device that separates and retrieves a plurality of loaded optical disks one by one in order from top, said device comprising:
    a base for loading the plurality of optical disks;
    a pulling-up unit for pulling up the top optical disk of the plurality of loaded optical disks;
    a separation member configured to cause a force to act on an inner wall of an inner hole of a plate-like member having the inner hole; and
    a separation member elevating unit for moving the separation member in a vertical direction,
    wherein the pulling-up unit is configured to lift the top optical disk upward,
    wherein the separation member elevating unit is configured to pass the separation member through an inner circumferential hole of the top optical disk lifted by the pulling-up unit from an upper side to a lower side, and the separation member is configured to cause the force to act on the inner wall of the inner hole of the plate-like member adhering directly beneath the top optical disk to thereby separate the plate-like member;
    wherein the separation member is formed of an elastic material or a spring member, and a diameter of the separation member is larger than a diameter of the inner hole of the plate-like member, and
    wherein an outer edge portion of the separation member is configured to apply a frictional force on an upper portion of the inner wall of the inner hole of the plate-like member adhering directly beneath the top optical disk, by which the plate-like member can be separated from the top optical disk.

2. The optical disk retrieval device according to claim 1, further comprising a sensor for detecting whether or not the plate-like member adheres directly beneath the top optical disk, when the top optical disk is lifted upward by the pulling-up unit,
    wherein the separation member elevating unit is configured to, when the sensor detects that the plate-like member adheres directly beneath the top optical disk, pass the separation member through the inner circumferential hole of the top optical disk from the upper side to the lower side to separate the plate-like member.

3. The optical disk retrieval device according to claim 2, wherein the sensor is a reflection type beam sensor for detecting whether or not the plate-like member adheres directly beneath the top optical disk by determining whether or not a projected optical beam returns as reflected light.

4. The optical disk retrieval device according to claim 2, wherein the sensor is a transmission type beam sensor including a transmission type beam sensor projection portion and a transmission type beam sensor light-receiving portion, and
the transmission type beam sensor projection portion and the transmission type beam sensor light-receiving portion compose a sensor for detecting whether or not the plate-like member adheres directly beneath the top optical disk by determining whether or not an optical beam projected by the transmission type beam sensor projection portion is received by the transmission type beam sensor light-receiving portion.

5. The optical disk retrieval device according to claim 2, wherein the sensor is a transmission type area sensor including a transmission type area sensor projection portion and a transmission type area sensor light-receiving portion, and
the transmission type area sensor projection portion and the transmission type area sensor light-receiving portion compose a sensor for detecting whether or not the plate-like member adheres directly beneath the top optical disk by the transmission type area sensor projection portion projecting a wide beam and the transmission type area sensor light-receiving portion measuring an amount of reaching light of the wide beam.

6. The optical disk retrieval device according to claim 1, wherein the plate-like member is an optical disk.

\* \* \* \* \*